Patented Jan. 30, 1945

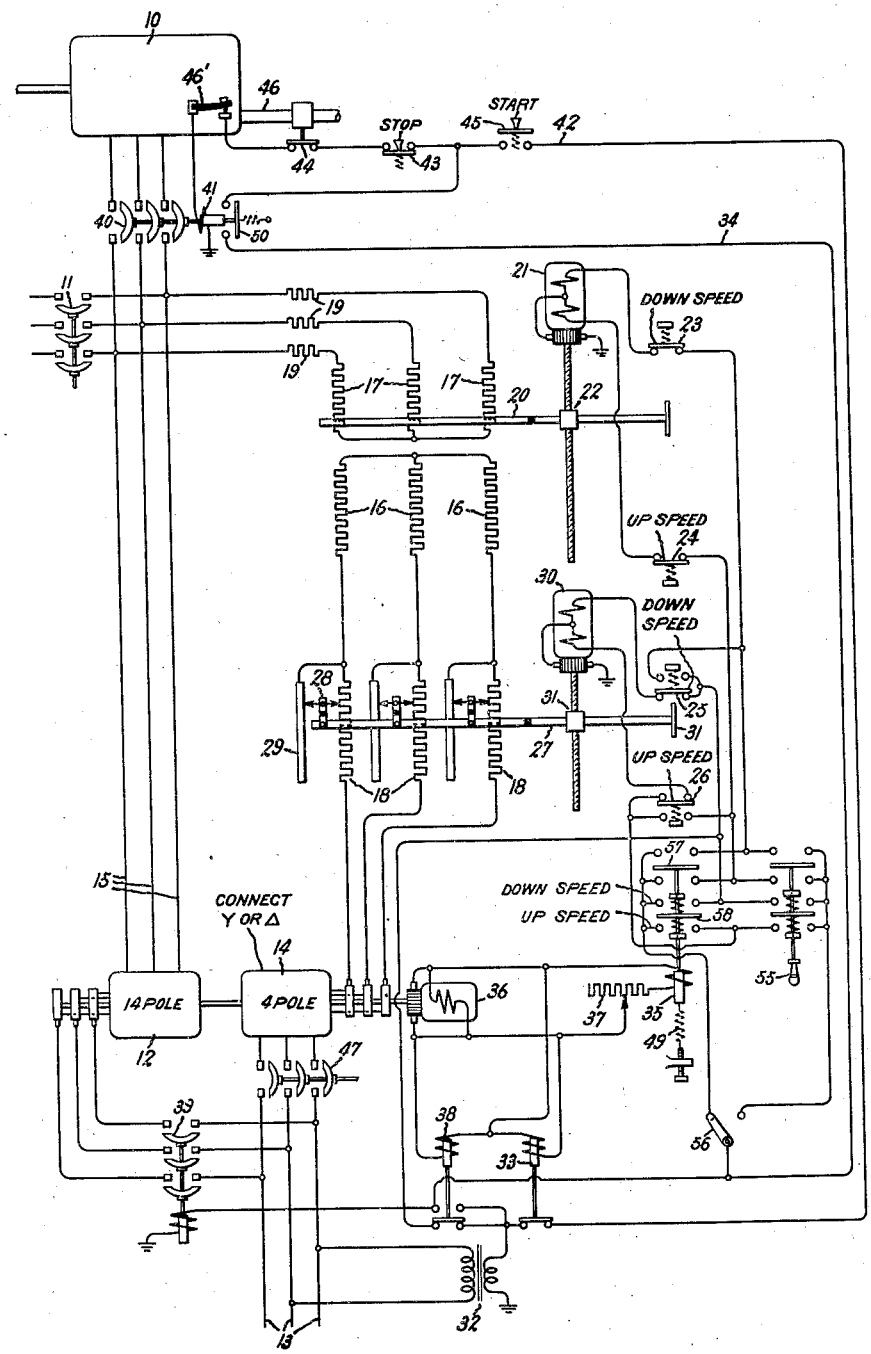

2,368,504

UNITED STATES PATENT OFFICE 2,368,504

VARIABLE FREQUENCY MOTOR CONTROL SYSTEM

Edward C. Vrooman, Schenectady, N. Y., assignor to General Electric Company, a corporation of New York Application January 19, 1944, Serial No. 518,848

7 Claims. (Cl. 172—281)

My invention relates to an alternating current control system where the voltage and frequency of a power supply for alternating current motors is varied in direct proportion over a wide range for the purpose of controlling the speed on the motors.

In carrying my invention into effect, I provide a rotary frequency transformer driven by an induction motor having a variable resistance in its secondary circuit by means of which the speed, and hence, the frequency and voltage of the frequency transformer may be varied. I further provide a variable resistance load on the frequency transformer for extending the range of its frequency regulation, and I control both resistances in sequence over the range of regulation by a common regulating means. In addition, I prefer to include a vernier resistance regulator in one of the variable resistance circuits for obtaining fine regulation which is effective throughout the complete range of regulation. The regulating system may be made entirely automatic in its operation and be adjusted to hold a selected motor supply frequency and voltage with considerable motor load variation. Certain interlocked safety features are preferably included to assure proper operation.

The features of my invention which are believed to be novel and patentable will be pointed out in the claims appended hereto. For a better understanding of my invention, reference is made in the following description to the accompanying drawing illustrating a preferred embodiment of my invention with automatic control.

In the drawing, 10 represents an alternating current motor such as a three-phase squirrel-cage induction motor, the speed of which is to be varied over a wide range from nearly zero speed upward by variation in its supply frequency and voltage. In order to mention an actual practicable example of the use of my invention, but not with the intention of limiting the invention to a particular use or frequency variation range, it may be stated that the motor 10 is used to test superchargers which are used on airplanes, and its load, not shown, is in the nature of a variable torque load, and that additional motors may be supplied in parallel therewith from the same variable frequency supply, as indicated by the circuit breaker 11. For testing superchargers the motor 10 will be assumed to be a two-pole, 140-H. P., 550-volt motor which is required to operate at various speeds up to about 8600 revolutions per minute, and hence, a variable frequency and variable voltage source of supply capable of giving up to 145 cycles and 550 volts is required. Such source comprises a 14-pole, three-phase, 100-kw. frequency transformer 12 having its rotor primary energized from a 60-cycle source 13 and driven in the direction at which it would tend to run as a motor but above its synchronous speed by a four-pole, three-phase, 60-cycle, 200-H. P. variable speed induction motor 14 energized from the same 60-cycle source 13. The 200-H. P. delta connected motor may be connected in Y to reduce its output to obtain line control at the lower loads. When machine 12 has its rotor primary energized at 60 cycles and is driven at 514 R. P. M., it will produce zero frequency and voltage at its secondary terminals 15. To obtain 145 cycles at its secondary, its driving motor 14 must run in the same direction as before at about 1760 R. P. M., which is approximately the full load slip speed of induction motor 14. Hence, in the example given, it is required that the set comprising motor 14 and frequency transformer 12 be capable of being varied over a speed range from about 1760 down to, say, 600 R. P. M., when supplying the motor 10 which is driving a load amounting to about 134 horsepower at high speed.

The higher speed portion of such regulation is primarily obtained by variation of resistance 16 in the secondary circuit of induction motor 14. For the low speed portion of such regulating range, resistance 16 is included in the secondary circuit of motor 14, and a variable resistance load 17 is connected across the secondary terminals 15 of the frequency transformer which is in addition to the motor load supplied therethrough. A variable vernier resistance 18 is also included in the secondary circuit of induction motor 14 and this vernier resistance is generally used to obtain fine speed regulation over any part of the speed regulating range. It will be understood that the vernier resistance at 18 is small as compared to the resistance at 16, and that variation of resistance sections 16 and 17 gives coarse adjustments and variation of resistance 18 gives a fine adjustment. Permanent resistance sections 19 are also preferably included in series with the resistances at 17 to reduce the regulating load through this circuit and to prevent short-circuiting frequency transformer 12.

It will be noted that the movable part of the resistance regulating means for resistances 16 and 17 is common to both and comprises the contact bar 20 which is moved over the resistance sections 16 and 17 by a reversible pilot motor 21 through a nut and screw drive 22 which is more or less diagrammatically illustrated for the sake of clarity. It will also be noted that to raise the speed over the complete regulating range, bar 20 is moved continuously from the upper end of resistance sections 17 to the lower end of resistance sections 16. At an intermediate point bar 20 leaves sections 17 before it contacts sections 16, and the resistance sections are so proportioned with respect to the load currents involved at this speed point that the speed regulating curve is smooth and there is no large jump in speed when the bar moves between sections 17 and 16. Normally closed limit switches 23 and 24 are provided in the pilot motor circuit to stop the motor 21 when the extremities of the regulating range are reached. The pilot motor 21 may be energized through contacts of a speed responsive relay 35, a manual control switch 55 or through limit transfer switches 25 and 26 of the vernier rheostat now to be more fully described.

Supported on and insulated from a bar 27 are brushes 28, one for each phase of resistance sections 18. These brushes move between and connect the corresponding resistance section with stationary contacts 29 connected to the upper end of the respective resistance sections so that as the bar 27 is moved, the effective portion of resistance sections 18 are varied. These resistance sections are all in when the bar 27 is at the upper end and all out when the bar is at the lower end of its travel. Bar 27 is moved over its regulating range by a reversible pilot motor 30 and a nut and screw drive 31. The limit transfer switches 25 and 26 have a double set of stationary contacts. They are normally biased to close connections to reversible pilot motor 30 but when moved by the projection 31 of the rheostat as it approaches the limit of its travel in either direction, the active circuit of motor 30 is opened and the normally open contacts of the same switch are immediately closed, transferring control to pilot motor 21 of the main rheostat and the circuit of motor 21 which will operate the main rheostat in the same regulating direction that the vernier rheostat was moving when it reached the limit of its travel. Thus when the vernier rheostat 27 reaches the limit of its travel moving up in lowering the speed of motor 14, the energizing circuit of motor 21 is closed through switches 25 and 23, causing the main rheostat to operate to lower the speed of motor 14 either by increasing the resistance 16 in its secondary or reducing the load resistance 17 across the output terminals 15 of machine 12. To assist in the illustration, the limit switches are marked "up speed" and "down speed" and these markings refer to the direction of speed control of motor 14 when the correspondingly marked limit switches are closed to energize the pilot motors 21 or 30.

The energizing circuits of the pilot motors 21 and 30 receive energy from the secondary of a transformer 32 although it might be any other suitable available source. Normally the energizing circuit is through the upper contacts of a low speed relay 38, wire 34, and a double throw switch 56 in the left-hand position shown, and contacts of a speed responsive relay 35, the lower contacts marked "up speed" if the speed of motor 14 is below the desired value and the upper contacts marked "down speed" if the speed of motor 14 is above the desired value. Such upper set of contacts of relay 35 supplies energy to the "down speed" limit switches 25 and 23, and the lower set of contacts of relay 35 supplies energy to the "up speed" limit switches 26 and 24.

It will be noted that there are two groups of upper and lower contacts of relay 35. The upper group is controlled by a movable contact bar 57 fixed to the relay core, and the lower group, previously referred to, is controlled by a movable switch bar 58 resiliently coupled to the relay core. Also, the upper group of stationary contacts is more widely, vertically, spaced apart than the lower group. Hence, the lower group of contacts will always be closed before the upper group when the relay core moves up or down from the position shown, where all contacts are open, and depending upon the force applied, the bars 58 and 57 will be progressively moved to closed position in proportion to the speed change requirements. The bar 58 of the lower group of contacts, when closed, connects the power supply to the vernier pilot motor 30, and only to the coarse speed control pilot motor 21 through transfer contacts at switches 25 and 26 when the vernier motor has operated to the limit of its travel in the direction of speed change, and this is the normal functioning of the automatic control when relatively small changes are called for. However, when large speed changes are called for, both the upper and the lower groups of contacts, for the particular direction of speed change called for, are closed, and the coarse speed control pilot motor 21 receives energy through the upper bar 57 independently of the transfer contacts of switches 25 and 26, and without waiting for the vernier motor 30 to reach the limit of its travel. Thus, I have provided automatic means responsive to the speed of the motor 14 for controlling the operation of the coarse and fine speed adjustments thereof, either separately or simultaneously in accordance with the magnitude of the speed change called for.

At the right of relay 35 there is shown a manual switch 55 which duplicates the contact arrangement of the relay switch, and when the power supply is transferred to this switch 55 by throwing the switch 56 to the right, the manual switch 55 takes the place of the relay 35, and all of the circuits controlled by relay 35 can now be controlled manually by switch 55. Thus, manual or automatic control can be had, as desired. Speed responsive relay 35 is energized from a small tachometer generator 36 driven by and producing a voltage proportional to the speed of motor 14, and energizing circuit is through a speed adjusting resistance 37. A low speed relay 33 is also energized from the tachometer generator. The upper contacts of relay 38 control an energizing circuit to an electromagnetically operated circuit breaker 39 in the primary supply circuit to the rotary transformer 12 so that this switch will not be closed unless the set 12—14 is running and is up to a predetermined minimum speed. An electromagnetically operated circuit breaker 40 between leads 15 from the secondary of the rotary transformer 12 and motor 10 is provided, and the energizing circuit for the operating coil 41 thereof is through contacts closed by a relay 33 when this relay is in deenergized position, wire 42, one or more normally closed stop switches 43, a pressure safety switch 44, a temperature safety switch 46', and normally open start switch 45. The start and stop switches may be several in number and located at different points so as to control the starting and stopping of motor 10 from several locations.

The pressure switch 44 is controlled by the pressure in some part of the forced ventilating system 46 of motor 10 in order that the motor cannot be started or operated unless its forced ventilating system is in operation. A similar system consisting of a temperature switch 46' on the windings of motor 10 also protect this motor.

It will be noted that the lower contacts of relay 38 supply energizing current to the "down speed" limit switches 25 and 23 when relay 38 is deenergized and independently of the contacts of speed control relay 35 or the manual switch 55. The purpose of this is so that when the system is shut down, the vernier and main rheostats will always return to the low speed setting, and hence, will be set for the lowest speed operation whenever the system is started into operation.

The relay 33 has its coil energized from the tachometer generator 36 the same as relay 38. Relay 33 picks up at a somewhat higher voltage and speed than does relay 38, and serves to protect the apparatus in case an attempt is made to start up motor 10 when the speed of the set 12—14 is too high. In case it was attempted to start the motor 10 by closing start switch 45 at a time when the speed of frequency changer 12 is higher than would be prudent, starting is prevented by reason of the fact that the circuit through wire 42 is open at the contacts of relay 33 and it then becomes necessary to lower the speed of motor 14 until relay 33 drops out before the motor 10 can be started. After the line switch 40 has been closed by energizing its operating coil 41 through the start switch 45, line switch 40 closes its own holding circuit at contacts 50 and wire 34 through the upper contacts of relay 38. The motor 14 is provided with a circuit breaker indicated at 47 by means of which it is started and stopped. The position of the various switches illustrated, except those of relay 35, is that for the idle condition. Ordinarily, when in the idle condition, the rheostats controlling resistances 16, 17 and 18 will be in positions to open the "down speed" limit switches 23 and 25.

To start the frequency control system into operation, switch 47 is closed. Motor 14 comes up to a low speed condition with all of the resistances 16 and 18 included in its secondary circuit. Tachometer generator 36 will produce a voltage corresponding to the speed causing low speed relay 38 to pick up, thereby causing the switch at 39 to close, energizing the rotary transformer 12. Relay 38 is adjusted to pull up at a speed just higher than 514 R. P. M. of motor 12, so that the frequency and voltage at the secondary leads 15 of the rotary transformer are zero or nearly zero. Hence, the closing of circuit breaker 39 causes no disturbance. The coil of speed control relay 35 is also energized but it has no control of the speed until relay 38 picks up and closes its upper contacts. The speed of the set increases and between 514 and 600 R. P. M. relay 38 picks up, closing the energizing circuit through the contacts of speed control relay 35 and putting voltage on control circuit wire 34.

It is evident that motor 10 cannot be started until rotary transformer 12 is operating above its synchronous speed, considered as a motor, which is 514 R. P. M., and hence, the motor 10 cannot be started in the wrong direction. If rotary transformer 12 were energized while below 514 R. P. M., its secondary voltage would have a reversed phase rotation. As the speed of machine 12 increases above 514 R. P. M., it starts to supply load due to the resistance sections 19 across its secondary, which soon limits the speed to the low speed operating condition of the set 14—12. This low operating speed is now determined by the resistance adjustment at 37 in the energizing circuit of speed control relay 35, since this relay is now effective to control the speed by control of pilot motors 21 and 30. This relay may have other adjustments, such as an adjustable spring 49 and adjustable contacts. With relay 35 adjusted for the low speed setting so that it will not close its upper contacts for the voltage generated by tachometer 36 when the speed of the set ceases to increase under these conditions, the speed may be somewhere between 514 and 600 R. P. M. Relay 33 has not as yet opened its contacts in circuit 42. Motor 10 may now be started and testing begun at the lowest testing speed of such motor. The motor is started by momentarily closing a starting button 45, energizing coil 41. When switch 40 closes, a holding circuit for its operating coil is closed at contacts 50.

The low speed setting of relay 35 is with resistance 37 cut out. Relay 35 picks up and closes its upper contacts, energizing the "down speed" limit switches 25 or 23. However, since it is assumed that the vernier and main rheostat arms 27 and 20 are at the low speed ends of their limits of travel, switch 25 will have its upper contacts closed and switch 23 will be open. Hence, neither pilot motor 30 or 31 is energized, and the apparatus continues to operate at the lowest speed available. To raise the speed of motor 10, some of resistance 37 is inserted causing relay 35 to close its lower or "up speed" contacts. This puts energy on "up speed" switch 26, and motor 30 starts and lowers rheostat arm 27 to remove resistance 18 from the secondary circuit of motor 14 causing the speed of motor 14 to increase, thereby increasing the frequency and voltage output of rotary transformer 12 to motor 10. The voltage of tachometer generator 36 is also increased. If during this step in the regulating procedure, relay 35 opens its lower contacts but does not close its upper contacts, the speed adjusting operation will cease with a portion of the vernier resistance 18 cut out. Such operation would result from a very small adjustment of rheostat 37 from low speed position.

Now assume a higher speed is desired. Rheostat 37 is adjusted to insert more of its resistance, and relay 35 again closes its lower contacts. Motor 30 starts as before and cuts out more of the vernier resistance 18. If and when arm 27 reaches the lower limit of its travel, switch operating member 31 thereof operates transfer switch 26 and transfers control to pilot motor 21 through its "up speed" switch 24. Motor 21 now runs and first increases the resistance 17 which is connected across lines 15 thus removing some of this artificial load from frequency transformer 12 so that the set 14—12 will increase in speed, again increasing the frequency and voltage on motor 10. This will continue until relay 35 opens its lower contacts stopping the operation of motor 21, say, with rheostat arm 20 in some such position as represented in the drawing. It may so happen that the resulting speed of motor 10 is now slightly higher than that corresponding to the setting of resistance 37 and, if so, relay 35 will close its upper contacts energizing motor 30 of the vernier rheostat 18 through "down speed"

switch 25 in a direction to insert part of resistance 18 in the secondary circuit of motor 14, thereby lowering its speed until relay 35 opens its upper contacts. This may result in moving the rheostat arm 27 to some such position as that illustrated in the drawing, and the movement of the armature of relay 35 to open contact position. A further increase in speed is obtained by cutting in more of resistance 37. The lower contacts of relay 35 will close, first energizing pilot motor 30 through contacts 25 and, if necessary, pilot motor 21 through the transfer contacts at 26 and "up speed" switch 24. The higher speed settings of resistance 37 will result in arm 20 progressively moving down onto resistance sections 16, thereby first inserting all of load resistance 17 decreasing the artificial load on the machine 12, and, second, cutting resistance 16 out of the secondary circuit of motor 14. In each of these speed adjusting operations the vernier rheostat 18 will ordinarily be operated first, if not at the limit of its travel in the direction of speed change, and if this is not sufficient, arm 20 will next be moved in the proper direction to bring about the required speed change. Also, in each case where the coarse adjustment is too large and overshoots, the vernier rheostat will come into operation to make the necessary correcting adjustment, and this is true whether arm 20 be on resistance sections 17 or 16. Where fine control is unnecessary, the vernier rheostat may be omitted together with its limit and transfer switches.

To lower the speed setting, the resistance at 37 is decreased and the pilot motors 30 or 21, or both, are operated as previously described, but in the "down speed" direction, to move arms 27 and 20 upwardly to correct positions, pilot motor 30 making any necessary final corrective adjustment in the opposite direction after each such speed adjusting operation. If at any time a large speed adjustment is called for the upper bar 57 of relay 35 will close its contacts and both motors 21 and 30 will operate simultaneously to change the speed until the adjustment is nearly correct.

At any time motor 10 may be shut down by the opening of circuit 34 either by one of the safety devices 46 or 46', or by a stop switch 43. This does not necessitate stopping the set 14—12. The motor 10 may be restarted by closing one of the switches 45 without necessarily adjusting the speed control apparatus to its lowest speed setting. It is necessary, however, that the speed of the set be lowered to the point where relay 33 drops out and closes circuit 42. However, if the set 12—14 be shut down, the speed control apparatus is automatically adjusted to low speed condition because then the pilot motors 21 and 30 will be energized through the lower contact of relay 38 and their "down speed" limit switches 25 and 23 independently of the position of relay 35 until they have adjusted their rheostats to low speed positions.

In the example given above the frequency changer 12 was represented as driven in the same direction it would run as a motor. However, I may simply reverse its primary phase rotation and obtain a secondary frequency from 60 to about 265 cycles, with corresponding proportional voltage, by driving it from zero speed up to full load slip speed of the motor 14, and for certain applications this may be desirable; and such extended use of the invention is practicable using the similar control apparatus above about 120 cycles. It is thus seen that I have provided a wide range of speed control capable of very fine adjustment, using alternating current power, and that such control is obtained by operation of a single, small, adjusting device, such as the rheostat 37.

While the machine 12 has been described for controlling the speed of motors driving a fan type of load, the invention is applicable for supplying alternating current power for any other purpose where it is desirable to have the frequency and voltage vary proportionally over a wide range and under exacting control.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. Apparatus for supplying alternating current power at variable frequency and voltage comprising a wound secondary induction motor having resistance in its secondary circuit, an induction frequency changer driven by said motor, a common source of constant frequency alternating current supply for both of said machines, a resistance load connected across the secondary of said induction frequency changer in parallel with other load to be supplied thereby, and common means for controlling both of said resistances to increase progressively the resistance connected across the secondary of the frequency changer and to decrease the resistance connected across the secondary of the induction motor and vice versa.

2. A variable frequency alternating current supply system comprising a pair of mechanically connected wound secondary induction machines of different pole numbers, a constant frequency power supply for energizing the primaries of both machines, the machine of lower pole number being a motor and having a variable resistance in its secondary for speed control, the machine of higher pole number being an induction frequency changer and driven by the motor and having a variable resistance load connected across its secondary in addition to other load to be supplied thereby, and common control means operable in one direction to increase progressively the resistance connected across the secondary of the frequency changer and to decrease the resistance connected across the secondary of the induction motor to increase the frequency and voltage supplied by the frequency converter and operable in the opposite direction to reverse such control sequence to decrease the frequency and voltage supplied by the frequency converter.

3. Apparatus for supplying adjustable frequency alternating current power comprising a pair of wound secondary induction machines of different pole numbers with their rotor elements connected in driving relation, a constant frequency power supply for energizing the primaries of said machines, the machine of lower pole number being used as a motor and having a variable resistance in its secondary for varying its speed, the machine of higher pole number being used as a frequency changer and having a variable resistance load across its secondary in parallel with other load to be supplied thereby, common means for varying the resistances in the secondaries of both machines, the control range thereof comprising, first, increasing the resistance in the secondary of the frequency changer and, second, decreasing the resistance in the secondary of the induction motor to increase the speed of the set and the frequency supplied thereby and the reverse sequence for decreasing the speed of the set and the frequency supplied thereby, and means responsive to the speed of said set and adjustable for different speed settings for controlling said common resistance varying means.

4. Apparatus for supplying adjustable frequency alternating current power from a constant frequency supply source, comprising a pair of mechanically interconnected induction machines of the wound secondary type having different pole numbers and both having adjustable resistances connected across their secondary circuits, the machine of lower pole number being used as a motor to drive the machine of higher pole number which is used as an induction frequency changer to supply a variable frequency load connected in parallel with its secondary resistance, said two resistances being arranged in prolongation to each other and having a common movable adjusting means so as to be progressively varied thereby, the movement of said adjusting means in one direction over its range of adjustment causing, first, the resistance across the secondary of the frequency changer to be increased and, second, causing the resistance across the secondary of the induction motor to be decreased, a reversible pilot motor for operating said adjusting means in opposite directions over its range of adjustment, a voltage responsive relay for controlling the energization of said pilot motor and its direction of operation, means for energizing said relay by a voltage which is proportional to the speed of the induction machines, and means for adjusting the response of said relay to such voltage for changing the speed of said induction machines and the frequency supplied thereby.

5. Apparatus for supplying alternating current power at variable frequency comprising a wound secondary induction motor having resistance in its secondary, an induction frequency changer driven by said motor, a common source of constant frequency supply for both of said machines, a resistance connected across the secondary of the frequency changer in parallel with other load to be supplied thereby, common means for progressively adjusting both of said resistances to vary the secondary output frequency of said frequency changer including a range for low frequency output adjustment where the resistance in the secondary circuit of the frequency changer is varied and a range for higher frequency output adjustment where the resistance in the secondary of the induction motor is adjusted, a reversible pilot motor for operating said common adjusting means over said two ranges, means responsive to the speed of said motor, but adjustable for any desired speed setting within said low and higher frequency output ranges of resistance adjustment for controlling the energization and direction of operation of said pilot motor when said apparatus is in operation, and means for energizing said pilot motor in the proper direction to return the resistance adjusting means to its lowest frequency output regulating condition whenever said apparatus is shut down and the said resistance adjusting means is not already in such condition.

6. Apparatus for supplying alternating current power at variable frequency, comprising an induction motor having a resistance for coarse speed adjustment and a resistance for fine speed adjustment in its secondary circuit, an induction frequency changer driven by said motor, a common source of alternating current supply for both of said machines, a load resistance connected across the secondary of said frequency changer in parallel with other load to be supplied by its variable frequency output, common adjusting means for progressively increasing said load resistance and decreasing said coarse resistance to increase the output frequency of said frequency changer and vice versa, means having limits of travel in opposite directions for adjusting said fine resistance, automatic means responsive to the speed of said motor, but subject to manual adjustment to obtain different desired frequency changer output frequencies, for controlling the operation of said fine resistance adjusting means in the proper direction to obtain any such desired output frequency, and means for transferring such automatic control to the coarse resistance adjusting means whenever the fine resistance adjusting means reaches the limit of its operating range.

7. Apparatus for supplying alternating current power at variable frequency comprising an induction motor having a resistance for coarse speed adjustment and a resistance for fine speed adjustment in its secondary circuit, an induction frequency changer driven by said motor, a common source of alternating current supply for both of said machines, a load resistance connected across the secondary of said frequency changer in parallel with other load to be supplied by its variable frequency output, common adjusting means for progressively increasing said load resistance and decreasing said coarse resistance to increase the output frequency of said frequency changer and vice versa, means for adjusting said fine resistance and automatic means responsive to the speed of said motor for controlling the operation of said coarse and fine resistance adjusting means either separately or simultaneously in directions to correct the speed and in accordance with the magnitude of the speed change called for.

EDWARD C. VROOMAN.